United States Patent
Moss et al.

(10) Patent No.: US 9,467,859 B2
(45) Date of Patent: Oct. 11, 2016

(54) VIRTUAL KEY RING

(71) Applicant: Yale Security Inc., Monroe, NC (US)

(72) Inventors: Mary Moss, Nashville, TN (US);
Kevin Kraus, Monument, CO (US);
Mark A. Caterino, Prospect, CT (US);
Alicia Waters, Hermitage, TN (US);
Logan Serman, Bellevue, TN (US);
James McCracken, Franklin, TN (US);
Ronald Unger, Harvest, AL (US);
Christi Johnson, Spring Hill, TN (US)

(73) Assignee: YALE SECURITY INC., Monroe, NC (US)

( * ) Notice: Subject to any disclaimer, the term of this patent is extended or adjusted under 35 U.S.C. 154(b) by 216 days.

(21) Appl. No.: 14/026,518

(22) Filed: Sep. 13, 2013

(65) Prior Publication Data
US 2014/0373111 A1 Dec. 18, 2014

Related U.S. Application Data

(60) Provisional application No. 61/835,846, filed on Jun. 17, 2013.

(51) Int. Cl.
*H04L 29/06* (2006.01)
*H04W 12/08* (2009.01)
*G06F 3/0488* (2013.01)
(Continued)

(52) U.S. Cl.
CPC ............ *H04W 12/08* (2013.01); *G06F 3/0488* (2013.01); *G06F 21/36* (2013.01); *G07C 9/00309* (2013.01); *G07C 9/00* (2013.01);
(Continued)

(58) Field of Classification Search
CPC ..... G06F 21/31; G06F 3/0488; H04L 63/08; H04L 63/0833; H04L 63/083; G01C 21/3664
See application file for complete search history.

(56) References Cited

U.S. PATENT DOCUMENTS 7,657,849 B2    2/2010   Chaudhri et al.
7,706,778 B2    4/2010   Lowe
(Continued)

FOREIGN PATENT DOCUMENTS

GB       2402840 A    * 12/2004

OTHER PUBLICATIONS

Alan Henry, King Ring Stores Club Cards on Your Smartphone, Sep. 13, 2010, Webpage.*

(Continued)

*Primary Examiner* — Benjamin Lanier
*Assistant Examiner* — Shaqueal Wade
(74) *Attorney, Agent, or Firm* — Steven B. Phillips; Moore & Van Allen PLLC

(57) ABSTRACT

A virtual key ring is disclosed. A graphical representation of a key ring or keychain having a plurality of keys is displayed on a computing device, and a pre-determined gesture input from a user indicative of an interaction with the key ring or chain, or one of the keys is received. The wireless operation of a lock can be managed by then accessing stored information associated with a virtual key or the lock in accordance with the pre-determined gesture. Pre-determined gestures can include, for example, movement along a predefined path on a touch screen in order to select a virtual key from among the plurality of virtual keys. The computing device can be a wireless mobile computing device such as a smartphone. The computing device can use any wireless communication technology, NFC and Wi-Fi being examples.

24 Claims, 8 Drawing Sheets

(51) Int. Cl.
*G06F 21/36* (2013.01)
*G07C 9/00* (2006.01)
*H04W 84/12* (2009.01)

(52) U.S. Cl.
CPC .......... *G07C 9/00571* (2013.01); *H04L 63/08* (2013.01); *H04W 84/12* (2013.01)

(56) References Cited

U.S. PATENT DOCUMENTS

| | | | |
|---|---|---|---|
| 7,996,324 B2 | 8/2011 | Bishop et al. | |
| 8,150,374 B2 | 4/2012 | Lowe | |
| 8,209,637 B2 | 6/2012 | Chaudhri et al. | |
| 8,943,187 B1* | 1/2015 | Saylor | H04L 67/306 709/223 |
| 2010/0217674 A1 | 8/2010 | Kean | |
| 2011/0179368 A1* | 7/2011 | King | G06F 3/04815 715/769 |
| 2012/0081305 A1* | 4/2012 | Schrock | 345/173 |
| 2012/0114122 A1 | 5/2012 | Metivier | |
| 2012/0157058 A1 | 6/2012 | Lowe | |
| 2013/0024222 A1 | 1/2013 | Dunn | |
| 2013/0291096 A1* | 10/2013 | Finnan et al. | 726/19 |
| 2014/0049365 A1* | 2/2014 | Ahearn et al. | 340/5.51 |

OTHER PUBLICATIONS

Yale Security Inc., International Application No. PCT/US2014/042618, International Search Report and Written Opinion, Sep. 17, 2014.
Kwikset: Kevo—Bluetooth Electronic Lock, Jun. 3, 2013, https://web.archive.org/web/20130616045510/http://www.kwikset.com/Kevo/default.aspx.
August Smart Lock, Jun. 11, 2013, https://web.archive.org/web/20130611092455/http://www.august.com.
App Ends Your Need for a Spare House Key, Jan. 4, 2013, http://mashable.com/2013/01/04/sharekey/#.
Key Ring Stores Club Cards on Your Smartphone, Sep. 13, 2010, http://appscout.pcmag.com/android/269518-key-ring-stores-club-cards-on-your-smartphone.

* cited by examiner

VIRTUAL KEY RING

CROSS-REFERENCE TO RELATED APPLICATION

This application claims priority from co-pending, commonly-owned provisional patent application Ser. No. 61/835,846, filed Jun. 17, 2013, the entire disclosure of which is incorporated herein by reference.

BACKGROUND

Radio frequency devices can store credential information that can be used later for authentication of the user. This authentication can be accomplished using various protocols, including Wi-Fi, Bluetooth, or protocols more typically used by contactless smartcards. When presented to a reader/interrogator a contactless smartcard transmits the stored credential information for verification by the reader/interrogator. The reader/interrogator processes or can access the credential information and can determine if the device being presented is valid. If the reader/interrogator determines that the credential information from the device is valid then the reader/interrogator can initiate any number of actions allowing the holder of the device access an asset or complete a transaction. Radio frequency devices that are used for authentication in this way typically make use of short-range wireless communication for this purpose, notwithstanding the fact that the device may also be capable of longer-range, higher-power voice or data communication. However, any type of wireless communication standard can be used for authentication as described.

NFC ("near field communication") is a communication method that is showing great promise for communication between devices at short range. NFC is the protocol that is used by contactless smartcards working at 13.56 MHz. The communication protocol of a typical NFC chip can be seen for instance in Short Form Specification of the PN511-Transmission module, February 2004, from Philips Semiconductors, which is herein incorporated by reference in its entirety. The protocol used in NFC can vary depending on the mode of operation of the chip and reader/interrogator. For example, if an active NFC mode is used, a reader/interrogator is powered to generate an RF field. The target device has its own power supply for digital processing and communications. When the target device receives a communication from a reader/interrogator, the target device can use its own power supply to generate another RF field to answer the reader/interrogator. Alternatively, if a passive NFC mode is implemented, the target device answers a reader/interrogator command using a load modulation scheme. The target device is not powered; rather, the target device uses energy from the RF field created by the reader/interrogator.

NFC capabilities can be included in a smartphone so that the smartphone becomes a target device and can be used for authentication as described above. Many modern smartphones are also equipped with touch screens to handle user I/O. Such a device can interpret gestures that correspond to or take place in pre-defined areas of the screen as if the user is manipulating objects or icons that are pictured on the screen. Tablet computers and even some notebook computers can provide similar I/O capabilities.

SUMMARY

Embodiments of the invention implement a virtual key ring to enable operating a lock using a computing device. In some embodiments, a graphical representation of a key ring or keychain having a plurality of keys is displayed, and a pre-determined gesture input from a user indicative of an interaction with the key ring/chain or one of the keys can be received. A stored digital credential for the lock can be accessed to operate the lock, or updated for future use. Other tasks can also be accomplished such as editing, viewing, or deleting supplemental data or information about the credential, the lock, or the virtual keys.

In some embodiments, the wireless operation of a lock can be managed by displaying on the computing device display, a graphical representation of a key ring having a plurality of virtual keys. A pre-determined gesture input can be received from a user of the computing device, wherein the gesture input is perceptively indicative of an interaction with the key ring or at least one of the virtual keys. A processor in the computing device can then access stored information associated with a virtual key or the lock in accordance with the pre-determined gesture. Pre-determined gestures can include, for example, movement along a pre-defined path on a touch screen in order to select a virtual key from among the plurality of virtual keys. In such a case, the display can present to the user an impression that the user is sliding keys along a ring or rotating the ring. Pre-defined gestures can also include simply touching an area of the screen display. These gesture are merely examples.

In some embodiments, the user can use the graphical user interface (GUI) to access, alter, modify, enable, disable, revoke, delete, add, or update stored data corresponding to a virtual key. Such data could, for example, include the color or shape of the virtual key on a display screen, information as to the premises where the corresponding lock is located, and the like. Such stored data could also include information about the lock, such as manufacturer, battery status, and the like, whether this information is only briefly stored while it is being read from the lock itself, or is more persistently kept in the computing device.

Stored information can also include a stored digital credential for a lock, and a user of the graphical user interface (GUI) can use the interface to access, alter, modify, enable, disable, revoke, delete, add, or update the digital credential for the lock. In some cases, there can be more than one digital credential. One credential could be used to set up a group of locks and might be referred to herein as a setup key. Another digital credential may be used to open the lock. Provision can be made for one user to assign and/or forward a digital credential to another user.

At least some embodiments of the invention are implemented on a computing device including at least one radio subsystem, a touch screen, and a processor operatively connected to the radio subsystem and the touch screen. Memory within the device stores at least one stored digital credential for a lock and stored data corresponding to at least one virtual key. Memory within the device also stores computer program code executable by the processor to cause the computer system to display on the touch screen a graphical representation of a key ring and carry out other processes or sub-processes in accordance with embodiments of the invention.

The computing device would typically be a wireless mobile computing device and the memory can be a combination of internal flash memory and RAM. However, any computer system can implement all or part of an embodiment of the invention, and store data and computer program code on magnetic, optical or other media, and use either external or internal storage. A wireless computer system or computing platform used to implement an embodiment of the invention can use any wireless communication technology, NFC and Wi-Fi being examples. The processor and various components of the computer system together with executable computer program code form the means to carry out the various functions, processes and sub-processes of embodiments of the invention.

BRIEF DESCRIPTION OF THE DRAWINGS

FIG. 2 also illustrates the process of managing digital credentials according to at least some example embodiments of the invention.

DETAILED DESCRIPTION

Figure 1:
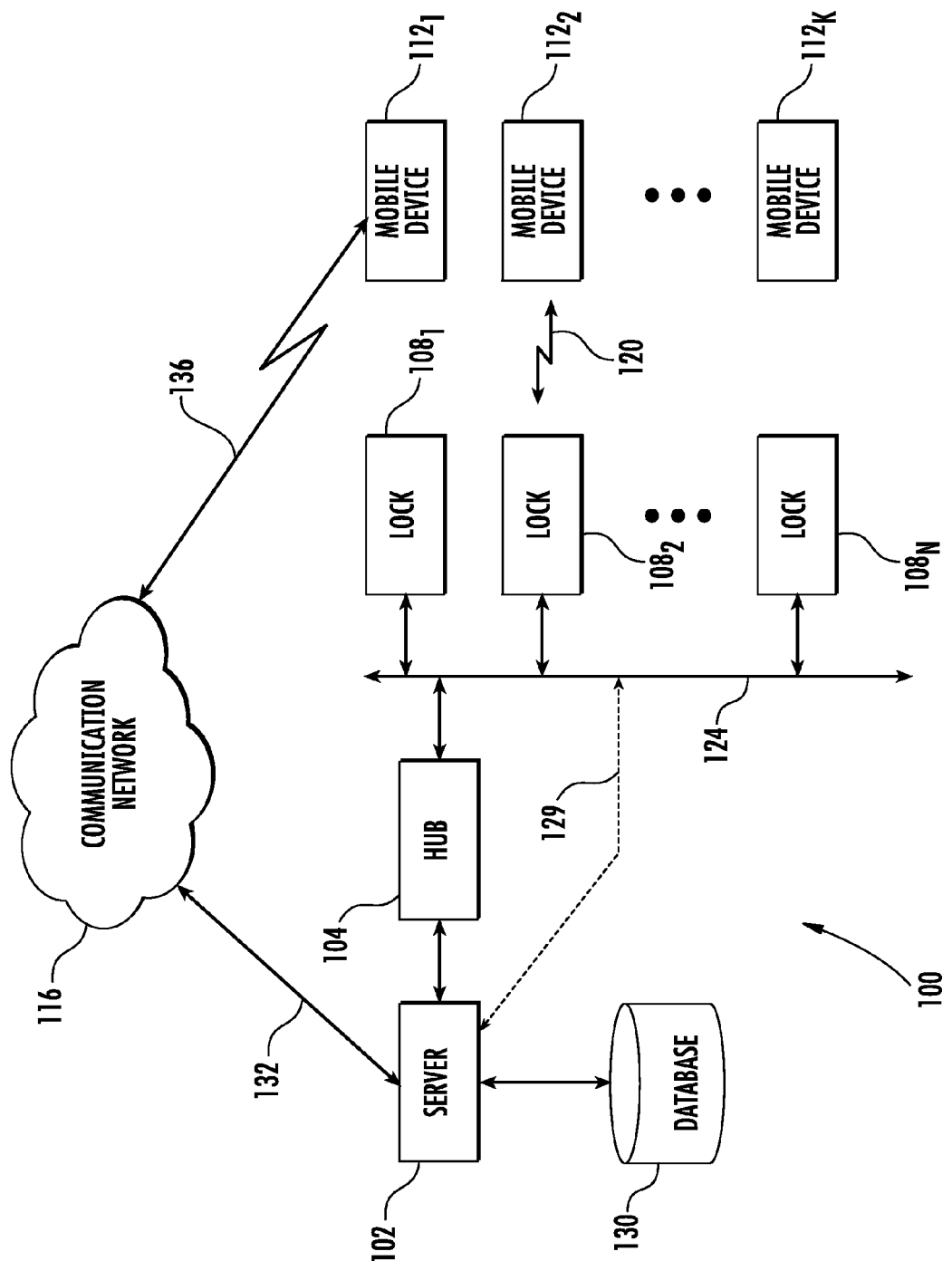
FIG. 1 is a system block diagram illustrating the network and operating environment of at least some embodiments of the present invention.

The following detailed description teaches specific example embodiments of the invention. Other embodiments do not depart from the scope of the present invention. It will be understood that when an element is referred to as being "connected" or "coupled" to another element, it can be directly connected or coupled to the other element or intervening elements may be present, and any or all of the connections can be mechanical, electrical, wires or wireless.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. Unless otherwise expressly stated, comparative, quantitative terms such as "less" and "greater", are intended to encompass the concept of equality. As an example, "less" can mean not only "less" in the strictest mathematical sense, but also, "less than or equal to."

The term "gesture input" may refer to touch screen-based actions that simulate manipulating physical objects. However, the term may also refer to camera-based gesture input systems, and input using mice, track pads, tablets, or other devices. The term "virtual" as in "virtual key" or "virtual key ring" is meant to refer to a graphical representation of an object such as a key or key ring. It should be noted that the digital credential for secure access to a system or device, such as a lock, in the vernacular might also be referred to as a "digital key." In general, the inventors have tried to refer to such a digital key has a "digital credential" in order to avoid confusion with the graphical representation of the key has used with certain embodiments of the intention. The term "key ring" and the term "keychain" can be used interchangeably herein.

Terms such as "information" and "stored information" are used herein in their broadest sense. Such terms are used refer to anything stored in memory or a storage medium other than computer program code. For example, stored information includes stored digital credentials to open locks, as well as stored data about the locks, virtual keys, users, and devices. Note that data can represent virtual or real world information and as such can include colors, shapes, photographs, locations, addresses, names, and the like.

As will be appreciated by one of skill in the art, embodiments of the present invention may or portions thereof may be embodied as a method, device, article, system, computer program product, or a combination of the foregoing. Any suitable computer usable or computer readable medium may be utilized for a computer program product to implement all or part of an embodiment of the invention. The computer usable or computer readable medium may be, for example but not limited to, a tangible electronic, magnetic, optical, electromagnetic, or semiconductor system, apparatus or device. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), a portable compact disc read-only memory (CD-ROM), or an optical storage device. The computer usable or computer readable medium may be one or more fixed disk drives or flash drives deployed in servers or workstations, forming a "cloud" or network.

Computer program code for carrying out operations of the present invention or for assisting in the carrying out of a method according to an example embodiment of the invention may be written in an object oriented, scripted or unscripted programming language such as Java, Perl, python, C++ or the like. However, the computer program code for carrying out operations of the present invention may also be written in conventional procedural programming languages, such as the "C" programming language or similar programming languages. The computer program code may also be written in HTML5 or similar languages that are commonly used for applications or "apps" intended to be run on mobile computing devices such as smart phones, tablets, smart watches, music players, and the like.

Computer program instructions may be provided to a processor of a general purpose computer, special purpose computer, server, workstation, mobile device or other programmable data processing apparatus to produce a machine, such that the instructions, which execute via the processor of the computer or other programmable data processing apparatus, create means for implementing the functions/acts necessary to carry out an embodiment of the invention.

Embodiments of the invention can implement a virtual key ring to enable operating a lock using a mobile device. In some embodiments, a graphical representation of a key ring or keychain having a plurality of keys is displayed, and a pre-determined gesture input from a user indicative of an interaction with the key ring/chain or one of the keys is received. A stored digital credential for the lock can be accessed to operate the lock, or updated for future use. Other tasks can also be accomplished such as editing supplemental data or information about the credential, the lock, or something else. In some embodiments, the gesture input received by an application (app) in the mobile device causes the activation of an RF interface between the mobile device and the lock to present the credentials. In some embodiments, the app, or an associated applet runs in the background and presents the appropriate credentials whenever the mobile device is in an interrogation zone for a known lock. In some embodiments, a gesture input can include movement along a predefined or partially predefined path in order to select a key from among the plurality of "virtual keys" on the virtual key ring or chain. A mobile device can include computer program code which, when executed by a processor, causes the mobile device to perform the method of an embodiment of the invention. A computer program product can include a medium with non-transitory computer program code that when executed causes a mobile device to perform the method according to an embodiment of the invention.

FIG. 1 depicts an access network 100 used to verify the identity of at least one mobile device according to at least some embodiments of the invention. In the example of FIG. 1, locks can communicate with a server directly in addition to communicating with mobile devices. In at least some embodiments of the present invention, the system 100 comprises a server 102, a hub 104, a plurality of locks $108_{1-n}$, each including a reader, and a plurality of mobile devices $112_{1-k}$ such that n and k are integers wherein n and k are greater than or equal to one, and typically k is greater than n. The plurality of locks $108_{1-n}$ may include readers of the same type, as well as readers of different types.

In the depicted embodiment, the locks 108 can be coupled to the server 102 via the interconnecting hub 104 through interface 124. In an alternate embodiment, the locks 108 may be directly coupled to the respective inputs/outputs of the server 102 via interface 129. Interface 124 between the locks 108, the hub 104, and the server 102 and interface 129 are generally bi-directional interfaces, which may selectively be implemented in a form of wired, wireless, fiber-optic communication links, or combinations thereof. These interfaces may include or be implemented by an actual local area network or by a virtual local area network over some great distance. In the latter case, the Internet might be used and a secure "pipe" or "tunnel" might be established between the locks or a lock and the server. The server may reside on the Internet. Even though the interfaces 124 and 129 are depicted as bi-directional interfaces, one of skill in art can appreciate that the interfaces may be implemented as unidirectional interfaces that use a unidirectional communication protocol, for example, the Wiegandz protocol.

As can be appreciated by one of skill in the art, the interfaces 124 and 129 may be implemented utilizing buses or other types of connections. For example, the I/O ports may be one or more of a USB port, parallel port, serial port, Small Computer Systems Interface (SCSI) port, modem, Ethernet, and/or an RF interface. The protocols used to communicate between the server 102 and the locks 108 may include one or more of the TCP/IP protocol, RS-232, RS-485, current loop, power of Ethernet (POE), Bluetooth, ZigBee, Wi-Fi, and other communication methods and protocols known in the art.

Bi-directional RF interfaces 120 between a lock 108 and a mobile device 112 are automatically established when the mobile device 112 is placed within an active zone (not shown) of the interrogating lock 108. The active zone of the reader in a lock 108 is defined as a three dimensional space where the intensity of RF signals emitted by the reader exceeds a threshold of sensitivity of the mobile device 112 and the intensity of RF signals emitted by the mobile device 112 exceeds a threshold of sensitivity of the reader in a lock 108. The interface 120 shown can be between one or a number of locks 108 and one or a number of mobile devices 112. Furthermore, the interface 120 may utilize known methods and protocols including NFC protocol, infrared communication methods, Bluetooth, ZigBee, Wi-Fi, and/or other protocols known to those of skill in the art.

The server 102 may be a general-purpose computer adapted for multi-task data processing and suitable for use in various settings including, but not being limited to, business, commercial, residential, and industrial settings. The server can also be a dedicated controller in a control panel, a number of control panels, a host computer, or, combinations thereof. A memory of the server 102 comprises software program(s) containing a database of records for the access system 100. Alternatively, a database 130 may be separated from the server 102 as depicted in FIG. 1. The database 130, whether integral to the server 102, separate from the server 102, or both, maintains records associated with the locks 108, mobile devices 112 and their respective holders or users, algorithm(s) for acquiring, decoding, verifying, and modifying data contained in the mobile device, algorithm(s) for testing authenticity and validity of the mobile devices 112, and algorithm(s) for implementing the results of these tests. Specific configurations of the server 102 are determined based on and compliant with computing and interfacing capabilities of the locks 108 and/or the hub 104. As used herein, in reference to an individual or an object associated with a mobile device 112, the terms a "holder" and a "user" are used interchangeably.

Each lock 108 is adapted for exchanging information with the server 102 and for requesting data from the mobile device 112 to verify the authenticity of the mobile device. In one embodiment, upon verification of credential information stored on the mobile device 112, the lock 108 generates signals facilitating execution of the results of interrogating the mobile device (e.g., engages/disengages a locking mechanism). Alternatively, the server 102 may generate such signals.

In addition to including proximity readers (e.g. readers that verify authenticity of mobile devices) the locks 108 may also have additional functionality. The locks 108 may include a keypad or other user input devices for receipt of additional user known passwords, contact card identification devices, and biometric authentication devices including voice recognition, retina scanners, finger print analyzers, facial feature analyzers, and the like.

In accordance with embodiments of the present invention, a stand-alone lock 108 may be utilized to perform the functionality of both the lock 108 and the server 102. This stand-alone lock 108 may include, or have access to, the database 130 that contains data used to determine the authenticity of a mobile device 112 and/or algorithm(s) used to make the determination of authenticity of the mobile device 112. A determination of authenticity for a mobile device 112 is made at the receiving point rather than having to transmit data across a network from the lock 108 to a server 102 in order to make a determination of authenticity. The stand-alone reader is further operable to execute instructions based upon the analysis of the mobile device 112. A user typically carries a mobile device 112 in order to verify his/her identity to a reader in a lock 108. Acceptable mobile devices 112 include, mobile cellular phones, personal digital assistants (PDAs), or any other mobile communication device that can be enabled for use in the access system 100 described. A notebook or other portable computer could also be used. Essentially, the mobile device 112 can perform functions associated with typical mobile devices and can also act like a smart card, RFID, or other type of identification device. Typical identification devices utilize various protocols to communicate their credential information to a reader in order to gain access to a particular asset. The mobile devices 112, in accordance with embodiments of the present invention, are enabled to communicate with locks 108 in a similar fashion to that of smart cards and the like.

In accordance with embodiments of the present invention, the server 102 is able to communicate with at least one of the plurality of the mobile devices 112 using a communication network 116. The communication network 116 utilized may be a conventional mobile radio network, for example, a GSM network, a Digital Cellular System (DCS), or Personal Communications Systems (PCS). The interface 132 may be a wired or wireless interface allowing the server 102 to communicate with various other entities connected to the communication network 116. The mobile device 112 communicates with the communication network 116 via interface 136. The communication network 116 provides a way for the server 102 to automatically notify and/or update information to the mobile devices 112 related to the access system 100. Additionally, the communication network 116 allows mobile devices 112 to communicate with each other.

Figure 2:
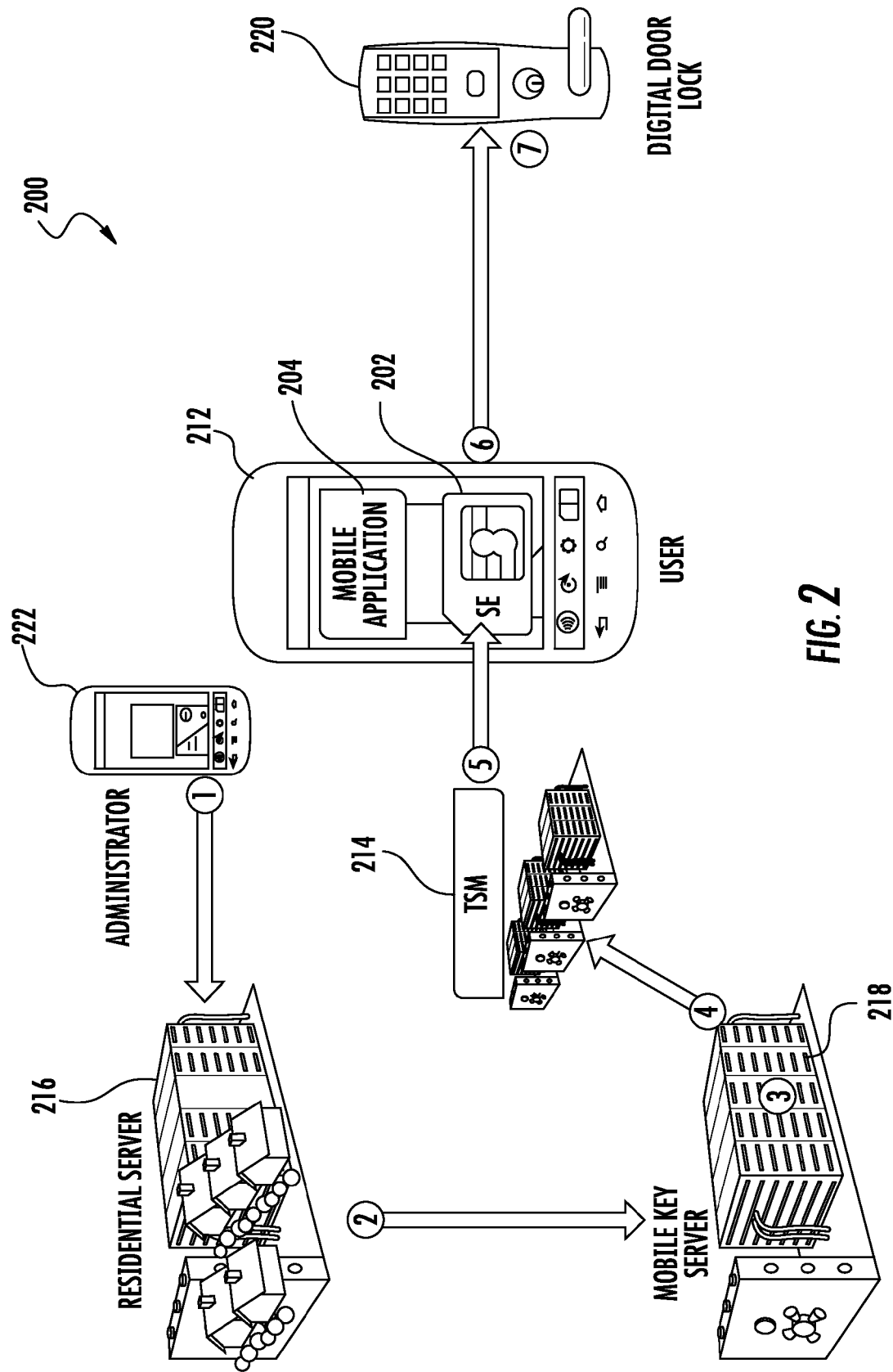
FIG. 2 is a system block diagram illustrating the network and operating environment of additional embodiments of the present invention.

FIG. 2 illustrates the network and operating environment for additional embodiments of the invention, wherein the digital lock(s) is/are not directly connected via a network to a server, but rather any information exchanged between the lock and the network infrastructure is exchanged via a smartphone or other computing device. The computing device in the example of FIG. 2 is a smartphone. In these examples, a Java™ based applet that preferably runs on a mobile phone's secure element is used but the applet can be embedded in an application running in memory. System 200 of FIG. 2 includes a secure element (SE) 202 in a user's smartphone mobile device 212. The applet that is "installed" or delivered to a phone's secure element by the chosen carrier's TSM ("trusted service manager") 214, is or includes actual digital credential(s) for a lock or locks. The applet handles NFC communication protocol to an NFC device (lock, reader, etc.) per ISO/IEC 14443 standards. Non-key and/or non-credential data can be transferred to or from a lock and a mobile app 204 to present appropriate screens and I/O to a user using the applet. Once the applet is installed, it can accept and store other or updated digital credentials. The mobile app and/or applet are supported by communication to and from the residential server 216 shown in the Figure via secure Internet connection. Note that the term "residential server" is used merely as a convenience. A system like that described herein can be used with commercial premises as well, in which case this server might be referred to as a "premises server" or by some other moniker. Again, NFC is given as an example of a wireless protocol to be used to communicate with the locks. Any other protocol can be used, with appropriate allowance for range, routing characteristics, and other differences between protocols. For example, the distance over which NFC communication or Bluetooth communication takes place is typically less than that of Wi-Fi based communication.

In example embodiments, a user of the system can be designated an administrator. In at least some embodiments, administrators are users who have added a lock to an account at the servers and installed a "setup key." The setup key is a digital credential used to transfer decryption information to the target lock(s). Locks can belong to groups. If the same setup key is used to set up multiple locks a single digital credential will unlock all locks in that group. Once all locks in a group are set up, the setup key can be removed from the secure element (SE) in the mobile device and retained by the mobile key server 218 for future use, for example, if a user desires to add more locks to a lock group.

In at least some embodiments, administrators can set up notifications for individual locks or groups. These notifications can include push messages, SMS messages, and Emails. These notifications can be made configurable on a per key basis.

In example embodiments, users who are not administrators do not manage locks, but only have digital keys and associated credentials on mobile devices, managed by an appropriate app and/or applet, with the appropriate GUI. Using the app, any users can assign colors, images, descriptions, and to be associated with virtual keys and corresponding digital credentials. An administrator can issue a request to the residential server to revoke an existing credential, and the residential server will then pass that request along to the mobile key server. The process is essentially the same for issuing a new credential, which will ultimately show up as a virtual key on the GUI of the app on the appropriate mobile device. Arrows in FIG. 2 indicate the process and the order of the process steps is indicated with circled numbers.

In example embodiments, a user that receives a new digital credential is first prompted to accept or decline an "invitation." As previously mentioned, in addition to using the mobile app to interface to the residential server, the mobile app can be used to transfer non-key and/or non-credential related data to or from the lock. Such data can include configurable parameters like volume of audible alerts, language, re-locking times, local keypad based user PIN codes, etc. Data that can be retrieved from the lock, can also include lock history and battery status. In some example embodiments, a residential such as server 216 shown in the FIG. 2 is responsible for all account management, logging of account events, delivery of event notifications, billing, and interfacing to the mobile key server. In example embodiments, the residential server is not involved in the actual digital credential creation or the delivery of a secure element app or applet (SEA), but merely issues the requests for such activities.

In a typical residential scenario, a user purchases and installs an electronic lock 220. A smartphone is then used to navigate to an app store and, download and install the mobile app that implements the virtual key ring. When the app first runs, for example, in device 222, it will prompt the user to register and create an account at the residential server at step 1. The app, in response to messaging from the residential server 216 will then check the secure element 202 of the smartphone for the presence of applet, and will prompt the applet's installation if necessary. This initial user will normally also be an administrator and can then create a lock group, such as, for example, "My House" or "My Garage." A lock group can initially consist of only one lock if desired and new locks can be added to the group at a later date. Once the lock group is created, the residential server will automatically ask the mobile key server at step 2 to deliver a digital credential to a smartphone. The mobile key server creates and stores encryption information at step 3 that will be used for setting up locks in this group or to send a digital credential to a regular user to grant access to locks in the group.

In at least some embodiments, during initial setup, the lock and SEA exchange encryption rules and data. Transferring the same setup key and encryption rules initializes locks that are added to the group. If another group is created with one or more additional locks, a new setup key is issued. In some embodiments, the lock is put into setup mode by entering an appropriate PIN number on a keypad. If NFC is used, once a lock is setup, the lock can automatically detect the presence of the mobile device with the virtual key ring by RF pinging. If a ping is successful, the lock attempts to communicate to the mobile device's instance of the applet.

New, non-administrator users can be added when an administrator "sends" the user a digital credential to be assigned to a virtual key. The new user's mobile device is sent an invite at step 4 in FIG. 2, and the invite will instruct the new user to install the appropriate app if it is not already installed. The new user can then accept or decline the credential at step 5. Once the digital credential is installed in the secure element of the new user's device, it is associated with a virtual key on the virtual key ring, can be sent to a lock at step 6, causing the lock to operate at step 7. Note that a regular user for a lock group could also be an administrator of his or her own locks in his or her own group via the same app/applet installed on the user's mobile device.

Figure 3:
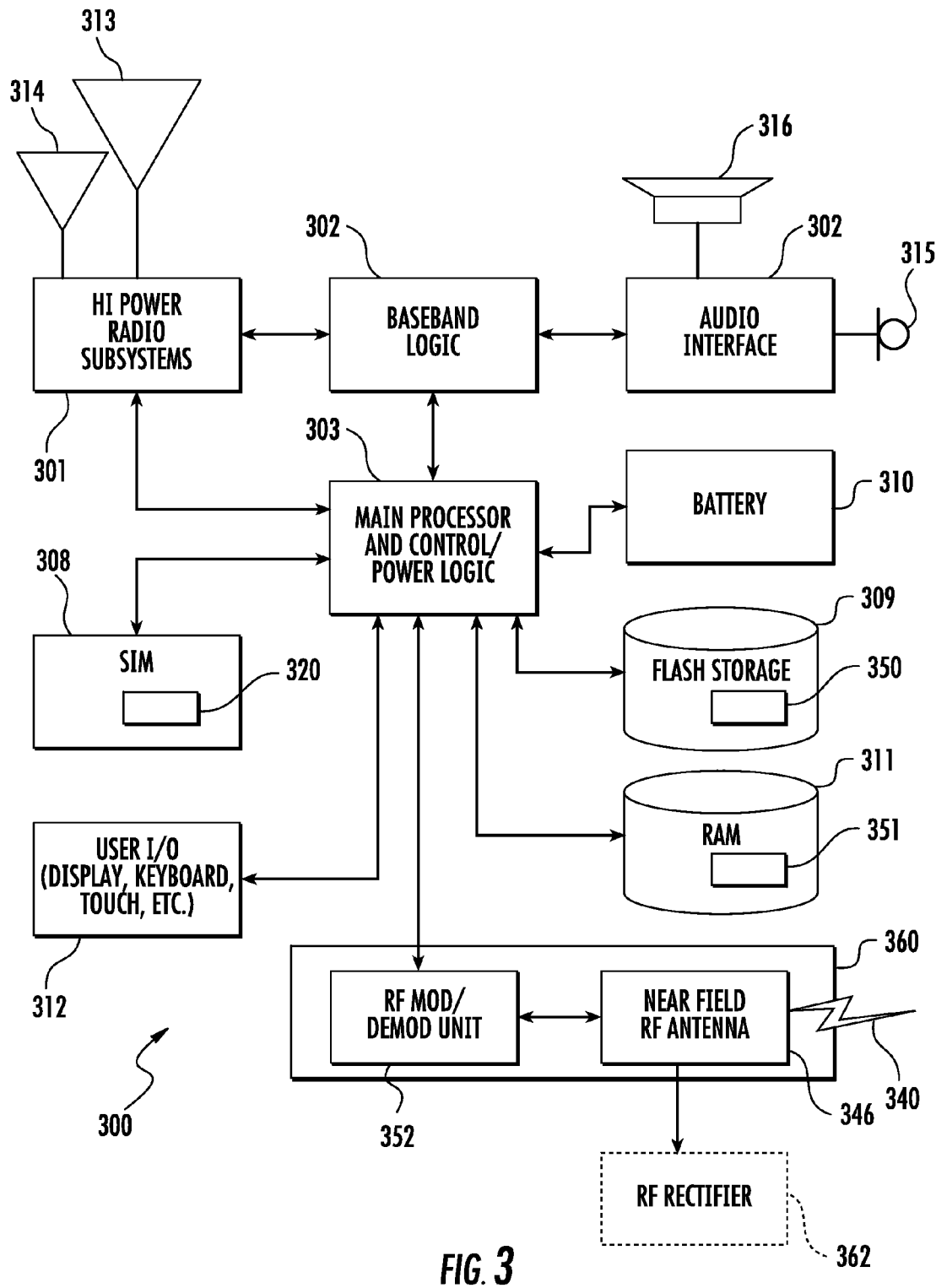
FIG. 3 is a schematic block diagram of a wireless mobile computing device according to example embodiments of the invention.

Referring now to FIG. 3, an exemplary mobile device 300 will be described in accordance with embodiments of the present invention. The mobile device of FIG. 3 includes a high power (hi power) radio subsystems block 301, a baseband logic block 302, a main processor and control logic block 303, and an audio interface block 304. A subscriber identity module (SIM) 308 is shown as operatively connected to the main processor and control logic. Also included is flash storage 309, a battery 310, and random access memory (RAM) 311. The RAM may include various devices and possibly memory dedicated to specific purposes such as graphics. The graphical capabilities of the mobile device 300 may be enhanced by a graphical processor (not shown). A portion of RAM 311 may be used to store the data currently being viewed on the display of the mobile device. The display is part of user input/output (I/O) block 312. Within the high power radio subsystems block 301, the transmit and receive information is converted to and from the radio frequencies (RF) of the various carrier types, and filtering using baseband or intermediate frequency circuitry is applied, as is understood in the art. Radio subsystems for more local communication such as for Wi-Fi may be included in this block. The device's main antenna system 313 is connected to the radio block 301. The device may also include a Wi-Fi antenna, 314. In the baseband logic block 302, basic signal processing occurs, e.g., synchronization, channel coding, decoding and burst formatting, as is understood in the art. The audio interface block 304 handles voice as well as analog-to-digital (A/D) and D/A processing. It also receives input through a microphone 315, and produces output through speaker 316. The main processor and control logic block 303, coordinates the aforementioned blocks and also plays an important role in controlling the human interface components such as a screen and touch interface or keyboard. The functions of the aforementioned blocks are directed and controlled by processing circuitry such as general-purpose microprocessors, digital signal processors (DSPs), application specific integrated circuits (ASICs), various types of signal conditioning circuitry, including analog-to-digital converters, digital-to-analog converters, input/output buffers, etc.

Digital credentials 320 for use with embodiments of the present invention may be stored in SIM 308. Other of the above-noted functions of the mobile device may be located on a SIM, which may take the form of a plug-in card, which identifies the user in the communication network. SIM cards are widely utilized in GSM mobile apparatus and a SIM card may serve as the secure element for a mobile computing device. Also, the SIM card may be either a full-sized card or a mini or mico-SIM; it is connected to the mobile device through a contact region (not shown) on the surface of the card. Other card formats, as well as contactless SIM cards, may likewise be used with embodiments of the invention.

As can be seen in FIG. 2, the mobile device, in some embodiments, communicates with external devices via a bi-directional, short-range interface 340. For example, the interface 340 is where the near-field RF antenna 346 transmits RF signals through free-space to be received by the locks. A lock includes a transceiver mounted on, mounted in, or connected to the lock to receive the near field RF signals transmitted by the mobile device 300. The near-field RF antenna 346 used by the mobile device 300 to create interface 340 may be a coil made by winding some wire, by printing or etching of a conductor film, or with strip lines. Depending on the application, a transmission frequency, for instance, of 125 kHz, 13.56 MHz, 400 MHz or 5.2 GHz is used, the applied frequency also being dependent on the data transmission where needed. A frequency of about 13.56 MHz is used for at least some standard, near field communication (NFC). However, in order to ensure compatibility with the readers in locks, various other frequencies may be used. Through interface 340, the mobile device 300 and a reader can exchange data with each other without contact and without making use of the communications network. As noted above, the interface 340 is created when the mobile device 300 enters an active region of a reader with or connected to a lock.

The flash storage 309 of the mobile device 300 generally comprises at least one array of non-volatile memory cells. RAM 311 comprises at least one array of dynamic random access memory (DRAM) cells. The content of the flash memory may be pre-programmed and write protected thereafter, whereas the content of other portions of the RAM may be selectively modified and/or erased. Flash memory therefore, is typically used to store operating system software and application programs (apps), including an app 350, which carries out the GUI method described herein in accordance with embodiments of the invention. RAM may be used to temporarily store credentials or other data, and some RAM may be used to store data 351 defining the display screen contents. As previously described, parts of the app or an "applet" used by the app can also be stored in the SIM or other secure storage in the mobile device.

The mobile device 300, according to at least some embodiments of the present invention, is used as an identification device. Identification information is preferably loaded into a secure area of the device where it can be accessed to communicate to locks via interface 340. In at least some embodiments, this identification information takes the form of a digital credential or digital credentials 320 stored in memory within SIM 308. In a device without a SIM the credentials can be encrypted and stored in flash or RAM. Any storage device that can be secured or have a secured storage area within the mobile device may be referred to herein as a "secure element" (SE). As previously mentioned an app or applet stored therein may be referred to as a "secure element app" (SEA). Identification information loaded may include credential information of the user of the mobile device 300, for instance, unique IDs, manufacture IDs, passwords, keys, encryption schemes, transmission protocols, and the like. When presented to a lock, the short-range RF antenna 346 typically receives interrogating signals via interface 340. The interrogating signals are in the form of RF signals produced by the reader in a lock.

In accordance with embodiments of the present invention, the flash storage 309, the SIM 308, or the RAM 311 may further contain self-authenticating data and/or functions. Examples of self-authenticating data include, but are not limited to, assets the mobile device 300 has access to, times of allowed access to each asset, and other data that can assist the mobile device in determining if it is eligible to gain access to a particular asset. The self-authenticating functions use the self-authenticating data to enable the mobile device 300 to make a determination of its own access rights with respect to an asset.

In at least some embodiments, mobile device 300 is presented to a reader. The reader in a device such as a lock is associated with one or more assets and the reader is the gatekeeper of those assets. The reader or its associated hardware, such as a lock, contains information about its associated assets and usually time of day information. In the case of a lock, upon presentation of the mobile device 300 to the reader, the lock supplies the asset information and time of day information to the mobile device 300. The mobile device 300 then analyzes the asset information and time of day information using its self-authenticating data. The mobile device 300 then makes a determination whether it is allowed to access the given asset (e.g., whether the holder of the mobile device 300 can have access to the premises behind a door). If the mobile device 300 determines that it is allowed access to the particular asset, then it sends a signal back to the reader indicating that validation of the mobile device 300 has been confirmed and access should be granted. Upon confirmation of validation of the mobile device 300, the lock will unlock the door. If the mobile device 300 determines that it is not allowed access to the particular asset, then it can either do nothing or send a signal back to the reader indicating that validation of the mobile device 300 was not confirmed and access should not be granted. Upon the receipt of this signal, the lock or other hardware associated with the reader may perform no action, generate a message indicating that access was not granted, sound an alarm, or perform some other sort of action in accordance with denying the holder of the mobile device 300 access to the asset.

In operation, the reader and the mobile device 300 use pre-programmed communication protocols. To increase the probability of error-free reception, the same messages may redundantly be repeated a pre-determined number of times or during a pre-determined timed interval. The interrogating reader generates an interrogating RF signal or "ping." The interrogating RF signal of the interrogating reader (or, if the protocol used by the mobile device 300 is an active protocol, RF signals produced by the mobile device 300) is received by the near field antenna 346 and is forwarded to the modulation/demodulation unit 352 that in turn demodulates the RF signal and provides the demodulated signal for processing to the processor and logic 303. Upon receipt of the ping by the processor, the flash storage or memory is accessed and relevant credential information is retrieved from the SE. The retrieved credential information is then passed on to the modulation/demodulation unit 352 where it is modulated and sent to the antenna 346. The short-range RF antenna 346 provides the modulated signal back to the reader via interface 340. At the reader in a lock the credential information is processed to determine the validity of the mobile device 300. This processing could also take place remotely at a server.

Modulation/demodulation unit 352 and antenna 346 in example embodiments together form a near field communication (NFC) subsystem 360. The RF signals generated by the reader inherently contain electromagnetic energy. The signals can be sent to the optional RF rectifier 362 and the energy from those signals can be converted into energy to run various components of the mobile device 300, reducing the battery drain that would otherwise take place from using the device as an NFC terminal. Battery 310 can still be used to supply power to any other component.

In accordance with embodiments of the present invention, the high power radio subsystems block 301 for communication with the communication network receives update signals (or other communication signals) from the communication network. In the event that the signal received is an update signal from a server that serves credentials, the demodulated signal is sent to the processor, which then updates the memory 300 based on the update signal. The high power radio subsystems (RF receiver(s)/transmitter(s)) 301 also allow the mobile device 300 to communicate with other devices connected to the communications network.

With embodiments of the invention, credential information can be automatically and remotely updated on a mobile device 300. An update, as an example, begins when credential information is changed at a server. As noted above, credential information can include any data, set of data, encryption schemes, digital keys, transmission protocol, and the like, used by a particular mobile device 300 to verify its authenticity to a lock. Altering, modifying, enabling, disabling, revoking, deleting, adding, and updating any portion of the credential information may effect a change in the credential information. The credential information changed at the server is then updated at a database, for example, the database 130 in FIG. 1. This change may include information relating to what mobile device the changed information is associated with. The mobile device corresponding to the changed information is then identified as the target device. For example, if the access rights of one user have been modified, then the mobile device associated with that user is the only mobile device that needs to have its respective information updated, and thus the single mobile device is the targeted mobile device. Alternatively, a change may relate to a number of mobile devices and each device will need to receive the updated information on its respective memory or SIM. Thus each mobile device will become a targeted device.

Once a targeted device is determined, a message is sent from the server to the determined (targeted) mobile device via the communication network. For example, that information is received at the mobile device through interface 136 in the system of FIG. 1 by the antenna at the mobile device. The processor updates the memory in SIM such as SIM 320 or any other memory or storage where the credentials reside to reflect the change that was made at the server.

Many modern mobile devices, such as so-called "smartphones" are equipped with touch screens to handle user I/O. Such a device can interpret gestures that correspond to touching pre-defined areas of the screen as if the user is manipulating objects or icons that are pictured on the screen as graphical elements. Larger mobile devices, such as some notebook computers or computers with track pads may interpret gestures that correspond to graphical elements on a separate screen in the same way.

In a touch screen based mobile device, the user I/O block 300 in FIG. 3 can include a touch-screen controller or a plurality of controllers that provide both output interface functions and input interface functions for the user. A touch screen controller receives or sends electrical signals from or to the touch screen. The touch screen displays visual output to the user. The visual output may include text, graphics, video, and any combination thereof. Some or all of the visual output may correspond to user-interface objects, further details of which are described below.

The touch screen accepts input from the user based on haptic contact. The touch screen and the touch screen controller can detect contact, changes in the contact area, or a break of contact with the touch screen and convert the detected contact into interaction with user-interface objects, such as a skeuomorph of keys on a virtual key ring as pictured in a touch screen display 400 illustrated in FIG. 4. In an example embodiment, the user of an app selects the virtual key ring display by touching an area corresponding to button 401. In at least some embodiments, when a point of contact between the touch screen and the user corresponds to the position of a graphical element that appears as, or is a skeuomorph of, a traditional metal pin and tumbler key such as key 402, the mobile device can activate the RF interface between the mobile device and a lock using credentials received via network and stored in the mobile device as described above. In other embodiments, such a selection simply displays stored data about the virtual key or the lock as the appropriate RF interface is automatically activated when the mobile device is close to a lock. The former system may be more appropriate for Wi-Fi enabled embodiments, and the latter for NFC enabled embodiments. The touch screen and touch screen controller may detect contact and any movement or break thereof using any of a plurality of touch sensitivity technologies, including but not limited to capacitive, resistive, infrared, proximity sensor arrays or other elements for determining one or more points of contact. In addition to a finger, a user may make contact with the touch screen using a suitable object such as a stylus.

In example embodiments of the invention, the app 350 stored in flash storage 309 of FIG. 3 performs the various operations related to detection of contact in a predefined area of a touch screen (or track pad of a notebook computer) corresponding to the appropriate graphical element, such as determining if contact has occurred, determining if there is movement of the contact and tracking the movement across the touch screen, and determining if the contact has been broken. Software components of the app in conjunction with software components in the operating system of the mobile device also render and display graphical elements corresponding to the desired functions or information. In a mobile device such as that illustrated in FIG. 3, data 351 representing the screen display can be stored in RAM 311 or in graphical memory dedicated to this purpose.

Figure 4:
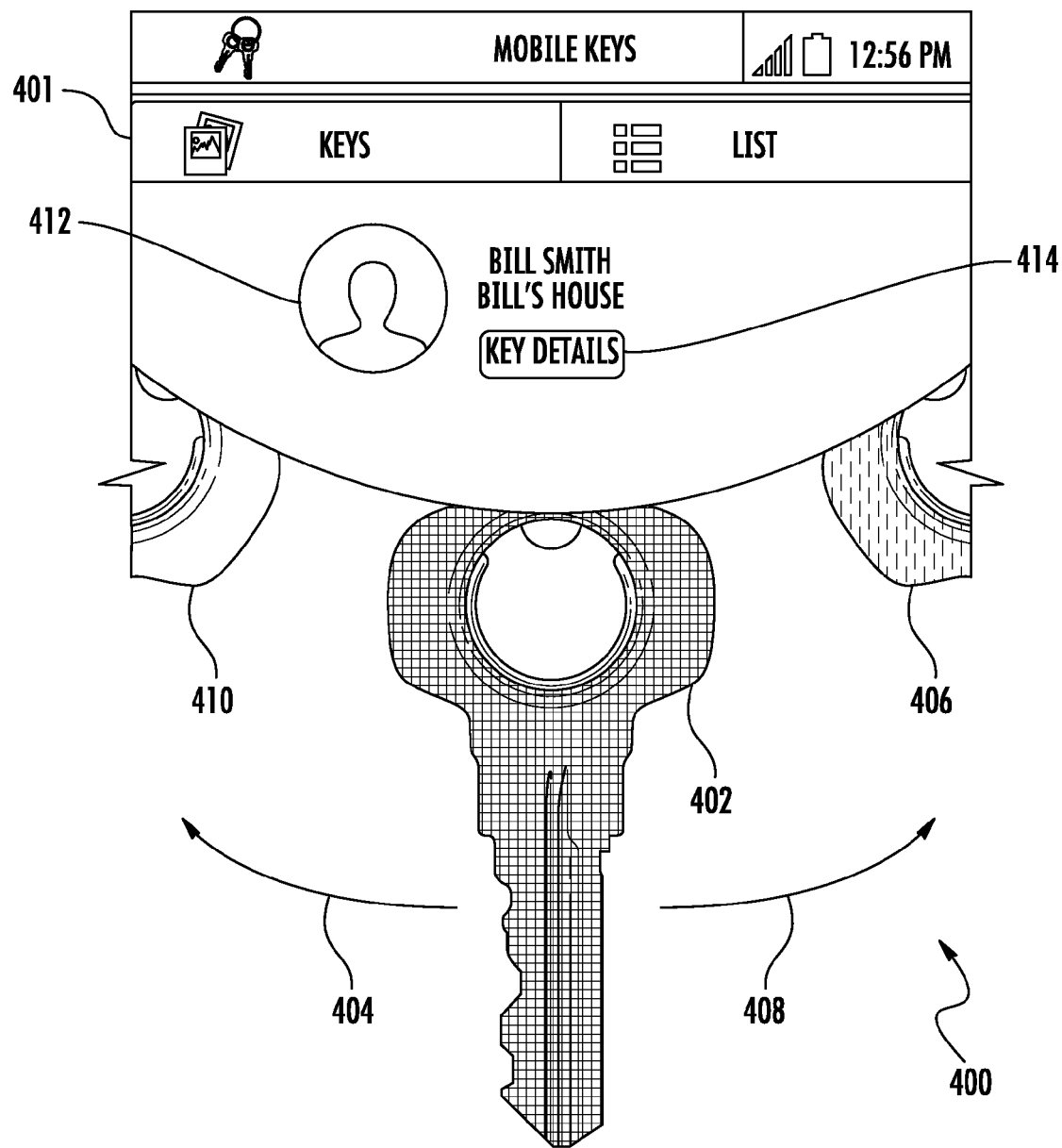
FIGS. 4, 5, 6 and 7 are screen shots illustrating the graphical user interface (GUI) for the virtual key ring according to at least some embodiments of the invention.

Using the means described above, the mobile device can also detect moving touch or gesture input by a user along a predefined or partially predefined path 404 of FIG. 4 designed to "rotate" the virtual key ring so that key 406 is centered on display 400 for an appropriate action. Likewise, similar motion along a predefined path or partially predefined path 408 can cause key 410 to be centered on the display. In this example embodiment, key 410 is "greyed out" and includes the term "pending" to indicate that that "slot" within the app's data has no digital credential assigned. Keys 402 and 406, as well as other digital or "virtual" keys on the virtual key ring that do have credentials assigned can be color coded or include icons thereon or other visual distinguishing graphical characteristics to make it easy to for a user to tell "which virtual key is which" by sight. Supplemental stored data can be displayed with the selected key, such as icon 412 with associated text, which may be an icon selected from a library or an actual photograph of a person or place associated with a particular key and corresponding set of digital credentials. A key detail soft button 414 is also present. Touching this button displays additional information associated with the virtual key such as an address, notes, dates connected with the lock credential, and the like. Such a button is an example of a predetermined area that can be touched to obtain information or make a change. Various levels of user interface screens can be included in the app to allow requesting and/or receiving credentials over the network as previously described, and assigning those credentials to specific, graphical virtual keys, as well as setting the appearance of the keys and accompanying supplemental data.

Figure 5:
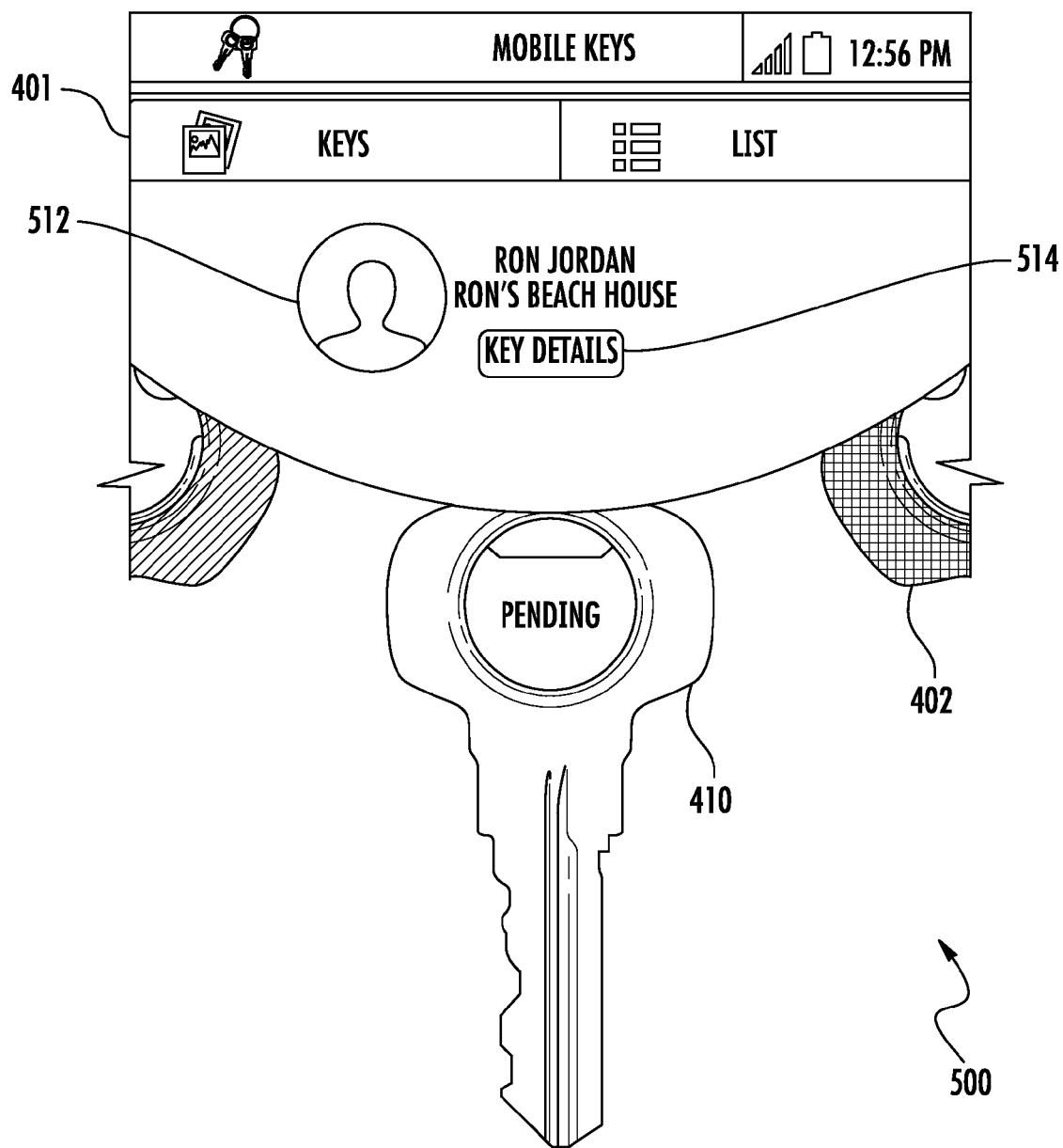
Figure 6:
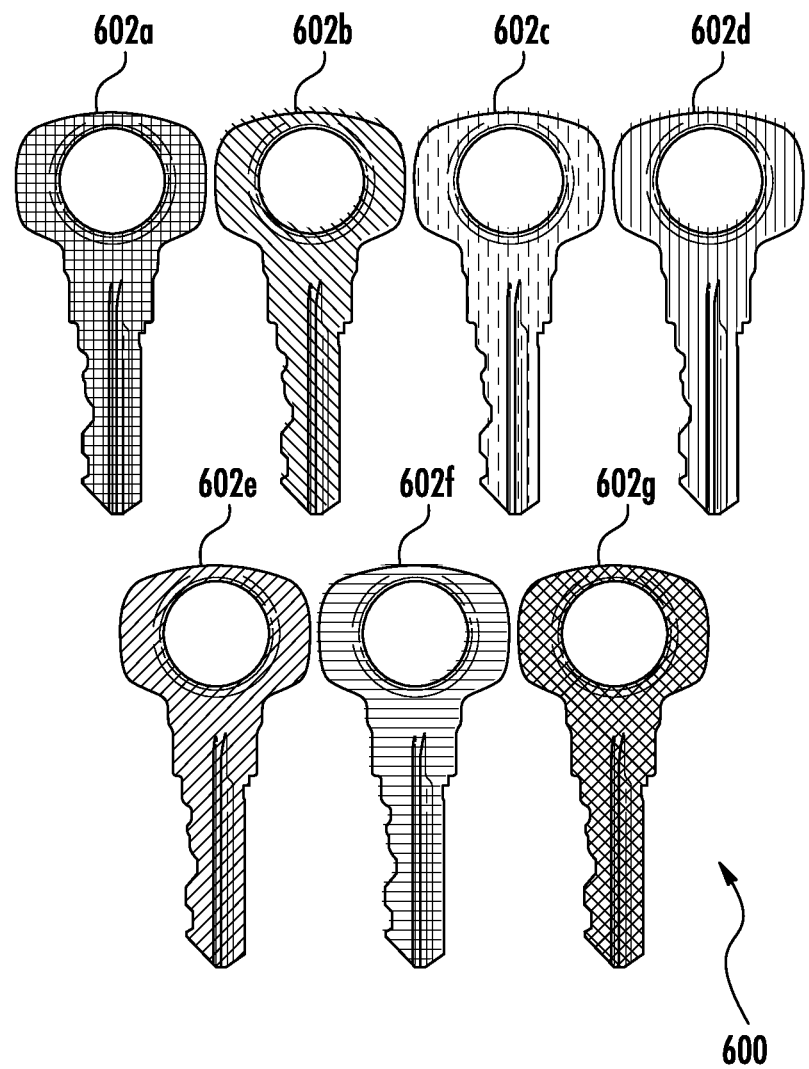

FIG. 5 is another screenshot, 500, of the touch screen of the same mobile device for which the screen is pictured in FIG. 4. In this case, the user has rotated the virtual key ring to "pending" key 410. The user has begun to populate stored data connected with this virtual key and lock. The user will be able to add a photo to be displayed in area 510. Details connected with this key and lock can be accessed with button 514. The user can also access a "color picker" screen through the key details button, and this color picker screen is illustrated in FIG. 6. FIG. 6 shows a screenshot, 600, with seven graphical key representations, 602a through 602g. In this example embodiment, each key is a different color. However, keys of different shapes, sizes, or with labels or patterns could also be used. Any number of keys could be used in a "key selection screen" to provide the user with the ability to assign a visually distinguishing characteristic to each virtual key on a virtual key ring or virtual keychain.

Figure 7:
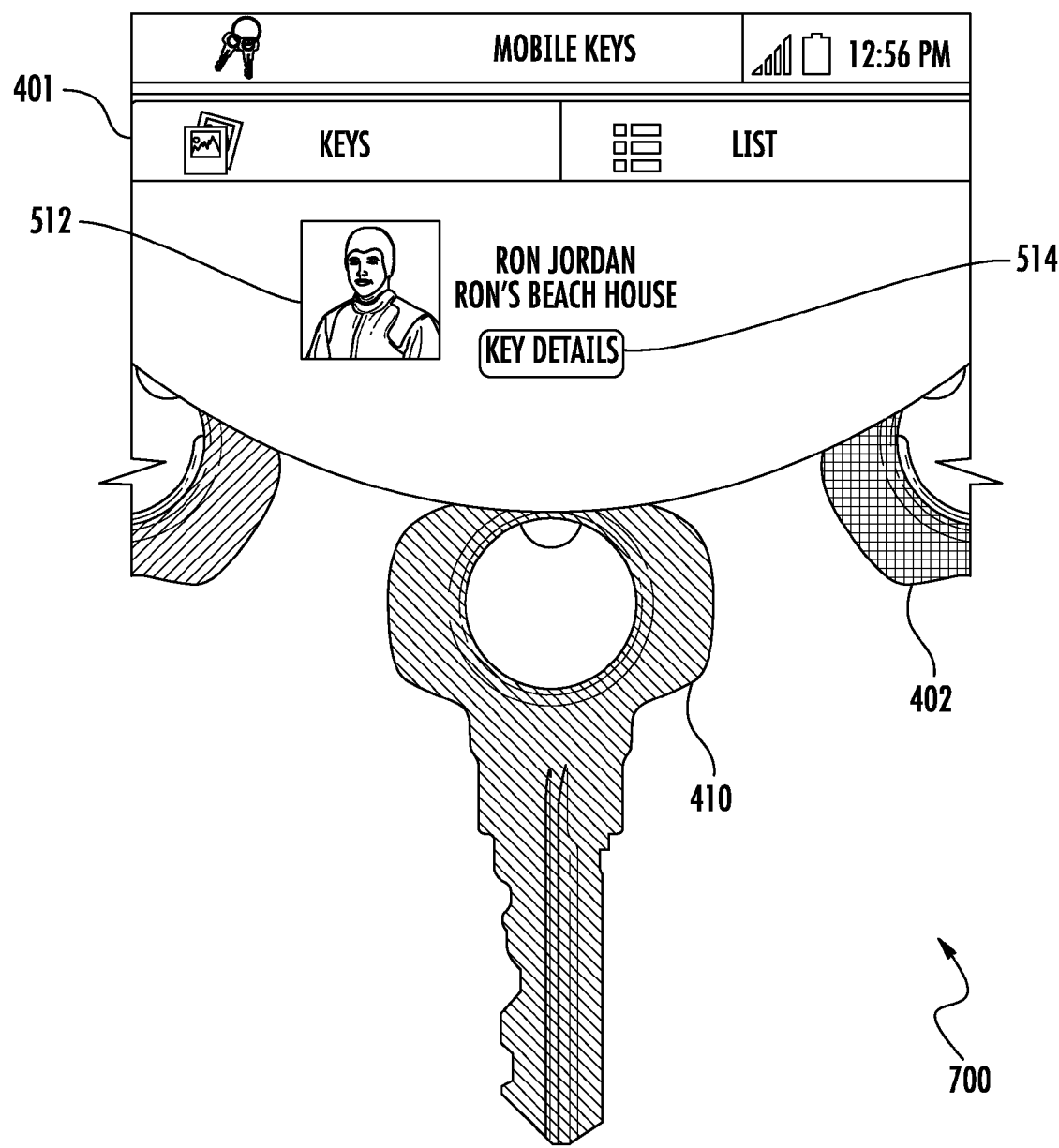

FIG. 7 shows a screenshot, 700, of the mobile device touch screen that has been presented in the previous screenshots. Key 410 has been assigned a color by the user. Additionally, a photo has been inserted at location 512. The user now could, by gesture along the appropriate predefined path as previously discussed, select and view details of all of the virtual keys on his or her virtual key ring.

Figure 8:
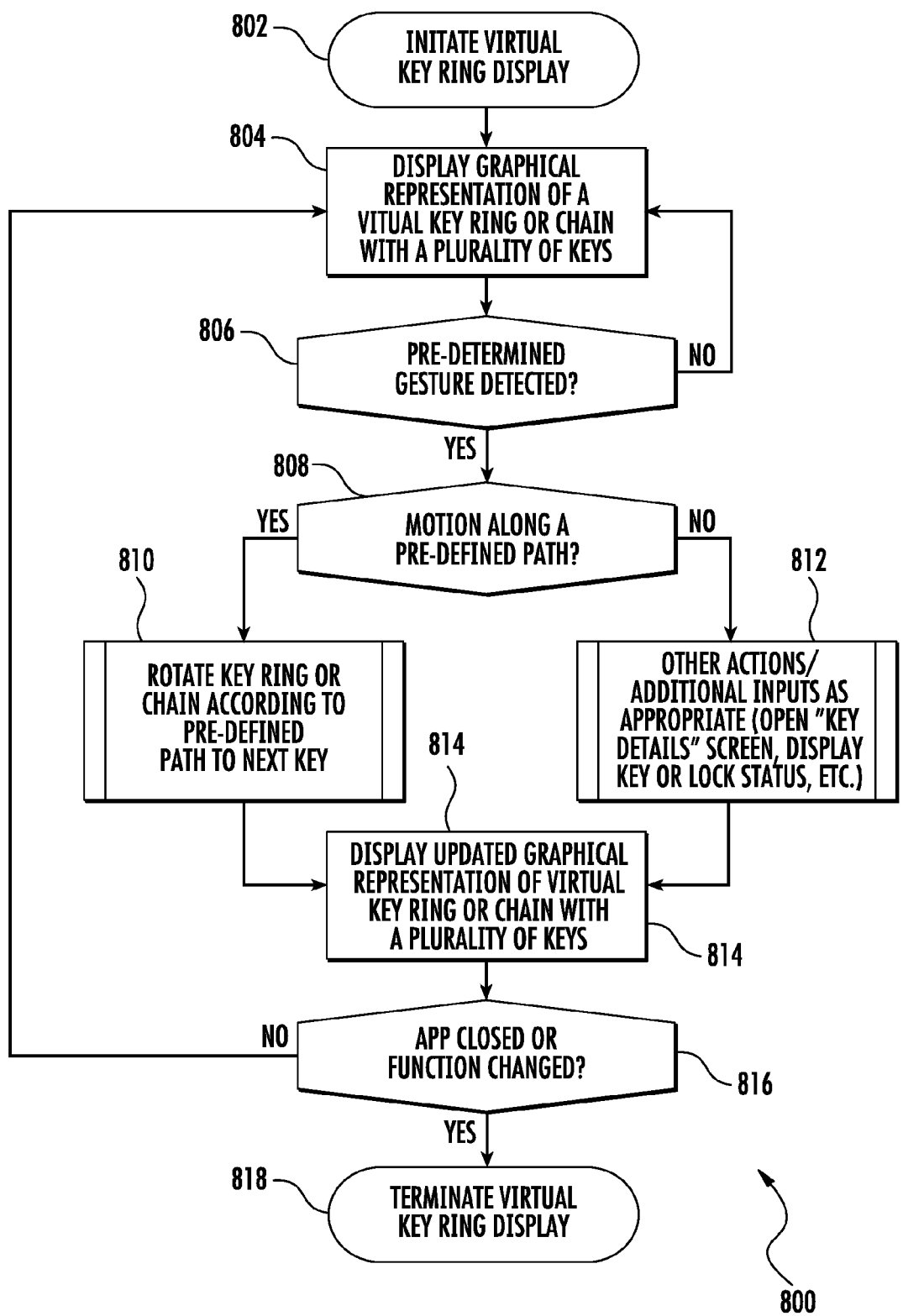
FIG. 8 is a flowchart illustrating a process according to example embodiments of the present invention.

FIG. 8 is a flowchart illustrating a process according to example embodiments of the invention. Like most flowcharts, FIG. 8 illustrates process 800 has a series of process or sub-process blocks. Process 800 begins at block 802 with the initiation of a virtual key ring display on the mobile computing device. At block 804, the graphical representation of a virtual key ring or chain with the plurality of virtual keys is displayed. At block 806, a determination is made as to whether a predetermined gesture is detected on a touch screen. If so, a determination is made at block 808 as to whether the gesture is motion along a predefined path, or some other gesture. Otherwise, processing branches back to block 804 at block 806, and the graphical representation of the virtual key ring continues.

Still referring to FIG. 8, if the motion along the predefined path to indicate rotation of the keys is detected at block 808, the graphical representation of the virtual key ring is rotated at block 810. Otherwise, at block 812, whatever other gestures have taken place are interpreted, and appropriate action is taken. These gestures could include touching the "key details" button, selecting a key with a touch, navigating menus, and the like. At block 814, the display is updated in accordance with any actions that were taken in the previous sub-process blocks. At block 816, if the app is closed, or a function not making use of the virtual key ring is selected, the virtual key ring display is terminated at block 818. Otherwise, processing branches back to the beginning to wait for another gesture.

As previously mentioned, distribution of an app to implement the virtual key ring could be via an "app store" or "app marketplace", with appropriate charges or free to customers who purchase hardware for a system described herein such as locks and/or networking components. In such a case, computer program code instructions for the app and/or applet, which cause the processor or processors in a mobile device to execute a method according to embodiments of the invention, can reside in or on a tangible electronic, magnetic, optical, electromagnetic, or semiconductor system, apparatus or device to be accessed by a server or servers for distribution.

The invention claimed is:

1. A method of managing wireless operation of a lock using a computing device, the method comprising:
    displaying by a processor in the computing device on a display, a graphical representation of a key ring having a plurality of virtual keys as a skeuomorph of keys on a key ring, wherein each virtual key appears as or is a skeuomorph of a pin and tumbler key;
    receiving a pre-determined gesture input from a user of the computing device by detecting haptic contact on a touch screen, the gesture input being indicative of an interaction with the skeuomorph of keys on the key ring and/or at least one of the skeuomorphs of the pin and tumbler key;
    presenting to the user on the display an impression that the user is sliding the keys along the key ring or rotating the key ring; and
    accessing by the processor in response to a selection by the user of a virtual key on the graphical representation of the key ring, stored information associated with at least one of the virtual keys and the lock.

2. The method of claim 1 wherein the gesture input comprises at least one of movement along a predefined path on the touch screen in order to select a virtual key from among the plurality of virtual keys; and touching a predefined area of the touch screen.

3. The method of claim 2 wherein the accessing of the stored information further comprises at least one of accessing, altering, modifying, enabling, disabling, revoking, deleting, adding, and updating stored data corresponding to the virtual key.

4. The method of claim 3 wherein the stored data comprises a representation of at least one of a color and a shape as a distinguishing graphical characteristic assigned by the user.

5. The method of claim 3 wherein the accessing of the stored information further comprises accessing stored data describing the lock.

6. The method of claim 2 wherein the accessing of the stored information further comprises at least one of accessing, altering, modifying, enabling, disabling, revoking, deleting, adding, and updating a digital credential corresponding to the virtual key and associated with the lock.

7. The method of claim 6 wherein the digital credential further comprises a setup key.

8. The method of claim 6 further comprising opening the lock.

9. The method of claim 6 further comprising assigning the digital credential to another user.

10. A computer program product for managing wireless access to a lock including computer program code in a non-transitory medium, the computer program code comprising:
    non-transitory instructions for displaying a graphical representation of a key ring having a plurality of virtual keys as a skeuomorph of keys on a key ring, wherein each virtual key appears as or is a skeuomorph of a pin and tumbler key;
    non-transitory instructions for receiving a pre-determined gesture input from a user of the computing device by detecting haptic contact on a touch screen, the gesture input being indicative of an interaction with the skeuomorph of keys on the key ring and/or at least one of the skeuomorphs of the pin and tumbler key;
    non-transitory instructions for presenting to the user on the display an impression that the user is sliding the keys along the key ring or rotating the key ring; and
    non-transitory instructions for accessing by the processor in response to a selection by the user of a virtual key on the graphical representation of the key ring, stored information associated with at least one of the virtual keys and the lock.

11. The computer program product of claim 10 wherein the computer program code further comprises non-transitory instructions for detecting movement along a predefined path on the touch screen in order to select the virtual key from among the plurality of virtual keys.

12. The computer program product of claim 11 wherein the instructions for accessing the stored information further comprise non-transitory instructions for at least one of accessing, altering, modifying, enabling, disabling, revoking, deleting, adding, and updating stored data corresponding to the virtual key.

13. The computer program product of claim 12 wherein the stored data comprises a representation of at least one of a color and a shape as a distinguishing graphical characteristic assigned by the user.

14. The computer program product of claim 12 wherein the instructions for accessing the stored information further comprises non-transitory instructions for accessing stored data describing the lock.

15. The computer program product of claim 11 wherein the instructions for accessing the stored information further comprises non-transitory instructions for at least one of accessing, altering, modifying, enabling, disabling, revoking, deleting, adding, and updating a digital credential corresponding to the virtual key and associated with the lock.

16. The computer program product of claim 15 wherein the digital credential further comprises a setup key.

17. The computer program product of claim 15 wherein the computer program code further comprises non-transitory instructions for opening the lock.

18. The computer program product of claim 15 wherein the instructions for at least one of accessing, altering, modifying, enabling, disabling, revoking, deleting, adding, and updating the digital credential further comprise non-transitory instructions for assigning the digital credential to another user.

19. A mobile computer system comprising:
    at least one wireless subsystem;
    a touch screen display to detect haptic contact;
    a processor operatively connected to the at least one wireless subsystem and the touch screen display; and
    a memory comprising at least one stored digital credential for a lock and stored data corresponding to at least one virtual key, wherein a virtual key appears as or is a skeuomorph of a pin and tumbler key, the memory also comprising computer program code executable by the processor to cause the mobile computer system to display on the touch screen display a graphical representation of a key ring including the at least one virtual key, appearing as a skeuomorph of keys on a key ring, receive a pre-determined gesture input by detecting haptic contact on the touch screen display indicative of an interaction with the skeuomorph of keys on the key ring and/or the skeuomorph of the pin and tumbler key, present to the user on the display an impression that the user is sliding the keys along the key ring or rotating the key ring, and access in response to a selection by the user of a virtual key on the graphical representation of the key ring, at least one of the stored digital credential and stored data.

20. The mobile computer system of claim 19 wherein the gesture input comprises at least one of movement along a predefined path on the touch screen display in order to select the at least one virtual key from among a plurality of virtual keys; and touching a pre-defined area of the touch screen display.

21. The mobile computer system of claim 20 wherein the stored data comprises a representation of at least one of a color and a shape of the at least one virtual key as a distinguishing graphical characteristic assigned by a user.

22. The mobile computer system of claim 20 wherein the digital credential further comprises a setup key.

23. The mobile computer system of claim 22 wherein the processor is operable to open the lock using the at least one wireless subsystem.

24. The mobile computer system of claim 23 wherein the at least one wireless subsystem comprises at least one of a near field communication (NFC) subsystem and a Wi-Fi subsystem.

* * * * *

UNITED STATES PATENT AND TRADEMARK OFFICE
CERTIFICATE OF CORRECTION

| | | |
|---|---|---|
| PATENT NO. | : 9,467,859 B2 | |
| APPLICATION NO. | : 14/026518 | |
| DATED | : October 11, 2016 | |
| INVENTOR(S) | : Mary Moss et al. | |

It is certified that error appears in the above-identified patent and that said Letters Patent is hereby corrected as shown below:

In the Claims

In Column 16, Claim 10, please change Line 13 from "non-transitory instructions for accessing by the processor" to --non-transitory instructions for accessing--

Signed and Sealed this
Eighteenth Day of April, 2017

Michelle K. Lee
*Director of the United States Patent and Trademark Office*